US006799903B2

United States Patent
Saito et al.

(10) Patent No.: US 6,799,903 B2
(45) Date of Patent: Oct. 5, 2004

(54) FUSION SPLICER AND FUSION SPLICING METHOD FOR OPTICAL FIBERS

(75) Inventors: Shigeru Saito, Chiba (JP); Noriyuki Kawanishi, Chiba (JP); Toshiki Kubo, Chiba (JP)

(73) Assignee: Fujikura Ltd., Tokyo (JP)

( * ) Notice: Subject to any disclaimer, the term of this patent is extended or adjusted under 35 U.S.C. 154(b) by 261 days.

(21) Appl. No.: 10/162,631

(22) Filed: Jun. 6, 2002

(65) Prior Publication Data

US 2002/0197027 A1 Dec. 26, 2002

(30) Foreign Application Priority Data

Jun. 6, 2001 (JP) .................................. P2001-171072
Jan. 17, 2002 (JP) .................................. P2002-009062

(51) Int. Cl.[7] .............................................. G02B 6/255
(52) U.S. Cl. .............................. 385/96; 385/97; 385/98
(58) Field of Search .............................. 385/78, 83, 95, 385/96, 97, 98

(56) References Cited

U.S. PATENT DOCUMENTS 6,062,743 A * 5/2000 Zheng et al. .................. 385/95
6,275,627 B1 * 8/2001 Wu .............................. 385/28
6,550,985 B2 * 4/2003 Nakamura et al. ............ 385/96

FOREIGN PATENT DOCUMENTS

JP 2000-98171 4/2000
JP 2000-275469 10/2000

* cited by examiner

Primary Examiner—Edward J. Glick
Assistant Examiner—Therese Barber
(74) Attorney, Agent, or Firm—Oblon, Spivak, McClelland, Maier & Neustadt, P.C.

(57) ABSTRACT

A fusion splicer and fusion splicing method for optical fibers is disclosed including a TV camera 32 which obtains transmitted light images passing through side areas of respective optical fibers 10, 20, an image processing unit 33 which calculates mode field diameters of the respective optical fibers from brightness distributions of the images in terms of directions traverse to the optical fibers to calculate a diametric difference between the mode field diameters, a movable base 57 to move abutted portions between the optical fibers relative to an electric discharge beam position, a drive unit 35 which implements additional electric discharge heating after applying electric discharge fusion splicing heating to the abutted portions while moving the electric discharge beam position toward one of the optical fibers, of which mode field diameter is regarded to be small, and a control unit 34 which controls an electric discharge power supply 36.

6 Claims, 6 Drawing Sheets

FUSION SPLICER AND FUSION SPLICING METHOD FOR OPTICAL FIBERS

BACKGROUND OF THE INVENTION

The present invention relates to an optical fiber fusion splicer and an optical fiber fusion splicing method for fusion splicing two optical fibers of different mode field diameters using an electric arc discharge.

When structuring communication cable networks or manufacturing equipments using optical fibers, there are often instances where two optical fibers of mutually different mode field diameters are fusion spliced. In such a case, if an attempt is made to merely use an arc discharge fusion splicer to fusion splice these two optical fibers, a connection loss becomes larger than that of an instance where optical fibers of the same mode field diameters are connected to one another.

To address such an issue, in the state-of-the-art practice, various attempts have been made to connect two optical fibers of different mode field diameters to maintain the connection loss as low as possible. For instance, in an approach proposed in Japanese Patent Provisional Publication No. 2000-098171, when fusion splicing an optical fiber of a smaller mode field diameter on one hand and an optical fiber of a larger mode field diameter on the other hand, terminal ends of both the optical fibers are abutted to one another with abutted portions being fusion spliced using electric discharge heating and, thereafter, the electric discharge heating position is displaced from the abutted portions toward one of the optical fibers, of which mode field diameter is small, to apply additional electric discharge heating thereto in a reduced heating quantity to allow dopant of a core portion of the relevant optical fiber to be diffused for thereby permitting only the mode field diameter of the relevant optical fiber to be gradually enlarged in a lengthwise direction of the optical fiber.

Thus, by enlarging the mode field diameter of the relevant optical fiber of the smaller mode field diameter in a tapered shape, a substantial matching of mode field diameters of both the optical fibers at joint portions can be made, resulting in reduction of a connection loss. Also, the presence of an elongated tapered length enables connection of both the optical fibers with a limited increase in the connection loss that would be otherwise caused by a shortened tapered length, with a resultant further reduction in the connection loss.

Further, in Japanese Patent Provisional Publication No. 2000-275469, an alternative approach has been made in that, when establishing a matching of mode field diameters by applying additional electric discharge heating to an optical fiber of a small mode field diameter once fusion splicing operation has been conducted using an electric discharge heating, an attempt is made to obtain transmitted light images of the optical fibers after a fusion spliced condition, to estimate values of mode field diameters from brightness distribution curves and to estimate values of the mode field diameters of the optical fibers, one of which is applied with the additional heating using an estimated value for thereby observing a matching condition between the mode field diameters of both the optical fibers whereupon the additional heating is terminated when the matching condition is judged to fall in a sufficient range.

However, according to an aspect of the method proposed in Japanese Patent Provisional Publication No. 2000-098171, when fusion splicing the optical fibers of different mode field diameters, it is required to preliminarily find one of the two optical fibers, of which mode field diameter is small, and to set the optical fibers in fixed places. If such operation is wrongly carried out, then a reversed result appears, requiring nerves in fusion splicing operation.

With the approach proposed in Japanese Patent Provisional Publication No. 2000-275469, since the attempt is merely made to estimate the mode field diameters through image observations of the optical fibers to which the initial heating (fusion splicing heating) and the additional heating have been applied, there is a need for an operator to manually settle a travel distance in which the heating position is traveled toward the optical fiber of the smaller mode field diameter to be applied with the additional electric discharge heating, resulting in requirement not only in troublesome works but also in highly skilled experiences to achieve suitable settings with an inability in performing the splicing operation.

SUMMARY OF THE INVENTION

It is, therefore, a first object of the present invention to provide an improved optical fiber fusion splicer in which when splicing optical fibers of different mode field diameters, there is no need for an operator to set the optical fibers upon finding which optical fiber has a smaller mode field diameter and which is effective to automatically judge which settled optical fiber has the smaller mode field diameter to enable additional electric discharge heating to be applied to the relevant optical fiber of the smaller mode field diameter while automatically moving an electric discharge beam relative to the relevant optical fiber after electric discharge fusion heating.

It is a second object of the present invention to provide an improved optical fiber fusion splicer which when applying additional electric discharge heating to a relevant optical fiber while relatively moving an electric discharge beam thereto after fusion heating, enables a travel distance to be automatically optimized.

It is a third object of the present invention to provide an improved optical fiber fusion splicer which when applying additional electric discharge heating to a relevant optical fiber while causing an electric discharge beam to be relatively traveled after fusion splicing heating has been completed, enables a heating quantity to be automatically optimized.

It is a fourth object of the present invention to provide an optical fiber fusion splicing method in which when splicing optical fibers of different mode field diameters, there is no need for an operator to set the optical fibers upon finding one of the optical fibers, of which mode field diameter is small and in which judgment is automatically made to find one of the optical fibers settled, of which mode field diameter is small to enable additional electric discharge heating to be applied to the relevant optical fiber of the smaller mode field diameter and in such a way that a travel distance and a heating quantity are automatically optimized while automatically causing an electric discharge beam to be traveled relative to the relevant optical fiber after electric discharge fusion heating has been completed.

To address the above issues, according to a first aspect of the present invention, there is provided an optical fiber fusion splicer comprising an image pick up unit obtaining transmitted light images passing through side areas of abutted portions between two optical fibers of mutually different mode filed diameters, an image processing unit calculating mode field diameters of the respective optical fibers from brightness distributions of the images in terms of directions traverse to the optical fibers, an electric discharge heating unit applying electric discharge heating to the abutted portions with an electric arc discharge beam, a movable unit operative to move the electric arc discharge beam such that it travels relative to the abutted portions along an optical fiber axial direction, and a control unit controlling the electric discharge heating unit and the movable unit such that after conducting electric discharge fusion splicing heating to the abutted portions, a position of the electric arc discharge beam is traveled toward one of the optical fibers, of which mode field diameter is regarded to be small by the image processing unit, to apply additional electric discharge heating to the same to allow the mode field diameter of the relevant optical fiber to be enlarged.

Processing the transmitted light images due to lights passing through the side areas of the two optical fibers enables the respective mode field diameters to be calculated, providing a capability of automatically judging one of the optical fibers, of which mode filed diameter is small. For this reason, there is no need for an operator to preliminarily check which optical fiber has the smaller mode field diameter when setting the two optical fibers of the different mode field diameters to the fusion splicer and, even when these optical fibers are randomly set, the relevant optical fiber of the smaller mode field diameter is automatically detected, allowing the electric arc discharge beam position to be relatively traveled toward the detected optical fiber to apply the additional electric discharge heating thereto. Accordingly, it is possible to avoid an unfavorable result in that a difficulty is encountered in connecting the optical fibers at a low connection loss that would be otherwise caused by the absence of correct settings of the optical fibers due to operator's mistake or misjudgment, releasing the operator's need for using the nerve so as not to commit the mistake with a resultant reduction in load of the operator. Thus, it is possible for the electric arc discharge beam to be relatively traveled toward the relevant optical fiber of the smaller mode field diameter at all times to apply the additional electric discharge heating thereto regardless of the operator's erroneous work for permitting the smaller mode field diameter to be enlarged at a minimized connection loss.

According to a second aspect of the present invention, there is provided an optical fiber fusion splicer which, in addition to the feature of the first aspect of the present invention set forth above, compels the image processing unit to obtain a diametric difference between the respective mode field diameters of the optical fibers, and the control unit controls a travel distance, in which the movable unit is to be traveled during the additional electric discharge heating, in dependence on the diametric difference between the respective mode field diameters.

Processing the transmitted light images due to lights passing through the side areas of the two optical fibers enables the respective mode field diameters to be obtained while providing a capability of automatically obtaining the difference between these diameters. There is a correlation between such a mode field diametric difference and the travel distance during the additional electric discharge heating for enlarging the mode field diameter at its optimum value, and such a correlation can be preliminarily obtained through experimental tests. This provides a capability of automatically controlling the travel distance at an optimum value during the electric discharge heating in dependence on the mode field diametric difference, enabling the smaller mode field diameter to be enlarged at an optimum value to improve the connection loss. Thus, it is possible for the operator, even who has no experience and knowledge, to simply splice the two optical fibers of different mode field diameters in a simple manner at the low connection loss.

According to a third aspect of the present invention, there is provided an optical fiber fusion splicer which, in addition to the feature of the first aspect of the present invention set forth above, allows the image processing unit to obtain a diametric difference between the respective mode field diameters of the optical fibers, and the control unit controls a heating quantity, to be applied to the relevant optical fiber with the electric discharge heating unit during the additional electric discharge heating, in dependence on the diametric difference between the respective mode field diameters.

Processing the transmitted light images due to lights passing through the side areas of the two optical fibers enables the respective mode field diameters to be obtained while providing a capability of automatically obtaining the difference between these diameters. There is a correlation between such a mode field diametric difference and the heating quantity during the additional electric discharge heating for enlarging the mode field diameter at its optimum value, and such a correlation can be preliminarily obtained through experimental tests. This provides a capability of automatically controlling the heating quantity at an optimum value during the electric discharge heating in dependence on the mode field diametric difference, enabling the smaller mode field diameter to be enlarged at an optimum value to improve the connection loss. Thus, it is possible for the operator, even in the absence of his experience and knowledge, to simply splice the two optical fibers of different mode field diameters in a simple manner at the low connection loss.

According to a fourth aspect of the present invention, there is provided an optical fiber fusion splicer which, in addition to the feature of the first aspect of the present invention set forth above, allows the control unit to be preliminarily stored with travel distances, in which the movable unit is to be traveled, and heating quantities, to be applied to the relevant optical fiber with the electric discharge heating unit, both of which are obtained in dependence on combinations between optical fibers of given mode field diameters and is operative to select one of the travel distances and one of the heating quantities in response to information obtained with the image processing unit.

Since the mode field diameters of the optical fibers are preliminarily standardized for each optical fiber under the standard, the presence of the travel distances and the electric discharge heating quantities specified for respective combinations of the optical fivers of varieties of kinds in a preliminary stage and stored in the control unit provides a capability for the control unit to select one of the travel distances and one of the heating quantities in response to information obtained from the image processing unit. By so doing, there is no need for the travel distance and the heating quantity to be calculated on site using the functions each for each combination of the optical fibers, providing a practical advantage.

According to a fifth aspect of the present invention, there is provided an optical fiber fusion splicer which, in addition to the feature of the first aspect of the present invention set forth above, allows the electric discharge heating unit to be operative to control a heating quantity to be applied during the additional electric discharge heating such that the larger a travel distance between the position of the electric arc discharge beam and a center of the abutted portions, the lower will be the heating quantity.

The heating quantity required during additional electric discharge heating may be preferably regulated such that the larger the distance between the position of the electric discharge beam and the center of abutted ends of the two optical fibers, the lower will be the heating quantity so as to gradually decrease the degree of enlargement of the relevant mode field diameter to form the tapered shape. To this end, control is performed such that the larger the distance between the position of the electric discharge beam and the center of the abutted ends of the two optical fibers, the lower will be the electric discharge current, or the larger the distance between the position of the electric discharge beam and the center of the abutted ends of the two optical fibers, the higher will be the traveling speed of the electric discharge beam. To this end, forming the control unit in a structure to enable the above-described control to be carried out according to information, related to the difference between the mode filed diameters of the optical fibers, transmitted from the image processing unit, it is possible to control the extent of dispersion of dopant of the core portion of the relevant optical fiber of the smaller mode field diameter at an optimum rate to achieve an idealistically tapered mode dispersion pattern.

According to a sixth aspect of the present invention, there is provided a method of fusion splicing optical fibers, which comprises processing transmitted light images obtained due to lights passing through side areas of abutted portions between two optical fibers of mutually different mode filed diameters to calculate mode field diameters of the respective optical fibers from brightness distributions of the images in terms of directions traverse to the optical fibers while obtaining a diametric difference between the two optical fibers, fusion splicing the abutted ends of both the optical fibers by applying an electric discharge fusion heating to the abutted portions using an electric arc discharge beam, and enlarging the mode field diameter of one of the optical fibers, of which mode field diameter is regarded to be small by an image processing unit, while traveling the electric arc discharge beam toward the relevant optical fiber of the small mode field diameter along an axial direction thereof and applying an additional electric discharge heating thereto in such a manner that a travel distance of the electric discharge beam and an electric discharge heating quantity are determined in dependence on the diametric difference.

Processing the transmitted light images due to lights passing through the side areas of the two optical fibers enables the respective mode field diameters to be calculated, providing a capability of automatically judging one of the optical fibers which has the smaller mode filed diameter. For this reason, there is no need for an operator to preliminarily check which optical fiber has the smaller mode field diameter when setting the two optical fibers of the different mode field diameters to the fusion splicer and, even when these optical fibers are randomly set, the relevant optical fiber of the smaller mode field diameter is automatically detected, allowing the electric discharge beam position to be relatively traveled toward the detected optical fiber to apply the additional electric discharge heating thereto. Further, the presence of a capability of automatically controlling the travel distance and the heating quantity during the electric discharge heating at optimum values in dependence on the mode field diametric difference enables the enlargement of the smaller mode field diameter at an optimum value to be easily realized for eliminating the connection loss regardless of the operator's experience and capability.

DETAILED DESCRIPTION OF THE PREFERRED EMBODIMENT

Figure 1:
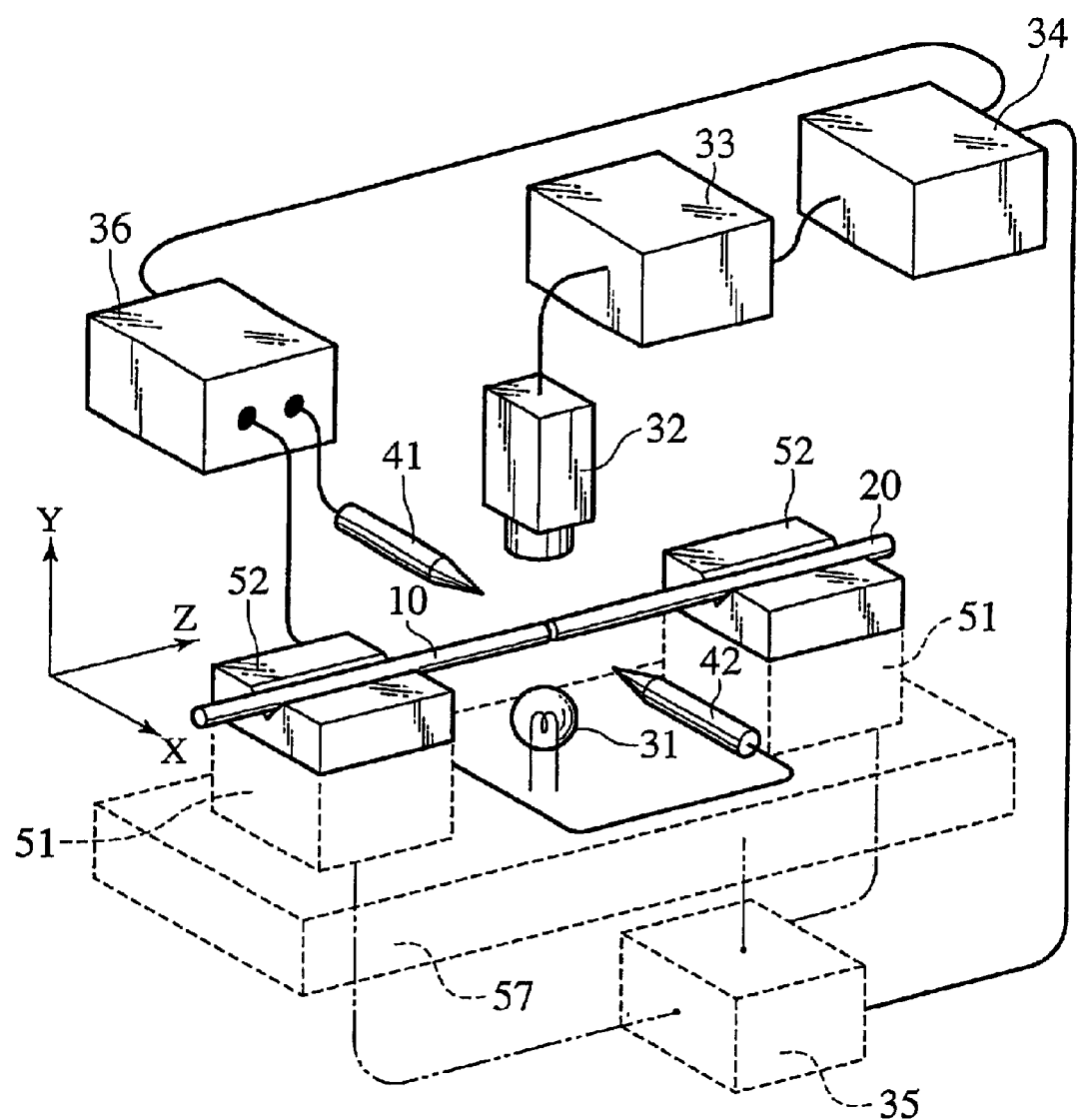
FIG. 1 is a typical view of an optical fiber fusion splicer of a preferred embodiment according to the present invention.

Referring to the drawings, a preferred embodiment of the present invention is described below in detail. FIG. 1 is a typical view of a conceptional principle illustrating an optical fiber fusion splicer of the preferred embodiment according to the present invention. In FIG. 1, V-recessed blocks 52, 52 are mounted on movable blocks 51, 51 for setting splicing ends of two optical fibers 10, 20, respectively. These movable blocks 51, 51 are structured to be movable in three axial directions of X, Y and Z axes. It is to be noted here that an axial direction (horizontal direction) of the optical fibers 10, 20, a horizontal direction perpendicular to the axes of the optical fibers and a vertical direction perpendicular to the axes of the optical fibers 10, 20 are assigned as X, Y and Z axes, respectively. These movable blocks 51, 51 are placed on a movable base 57 such that travel of the movable base 57 in the Z axis enables accompanied movements of the movable blocks 51, 51 and the V-recessed blocks 52, 52 in the same Z axis. The travels of these components are carried out with a drive unit 35.

Electric discharge electrodes (bars) 41, 42 are disposed in the X-direction in opposed relationship and fixedly supported with a suitable mechanism. The electric discharge electrodes 41, 42 are supplied with a high voltage from an electric discharge power supply 36 to allow an electric arc discharge to be produced between the electric discharge electrodes 41, 42. As a result of the electric arc discharge, heat is applied to a region at abutted ends of the optical fibers 10, 20 to heat them to perform fusion splicing of these abutted ends.

A light source 31 is used to project a light beam onto the region at the abutted ends of both the optical fibers 10, 20. A TV camera (image pickup unit) 32 is located in opposition to the light source 31 relative to the abutted ends of the optical fibers 10, 20 and functions to pick up transmitted light images passing through side areas of the abutted ends of both the optical fibers 10, 20. Output image signals delivered from the TV camera 32 are applied to an image processing unit 33 by which image processing is carried out. As a result of image processing, respective mode field diameters (MFD) of the optical fibers 10, 20 are calculated and a difference between the mode field diameters is also obtained as a mode field diametric difference. Information related to the optical fibers 10, 20 thus obtained is then delivered to a control unit 34, which in turn controls the drive unit 35 in dependence on such information to thereby control incremental travel distances of the respective movable blocks 51, 51 as well as the movable base 57 while controlling the electric discharge power supply 36 to regulate an electric discharge current and a time interval in which the electric discharge heating takes place.

Figure 2:
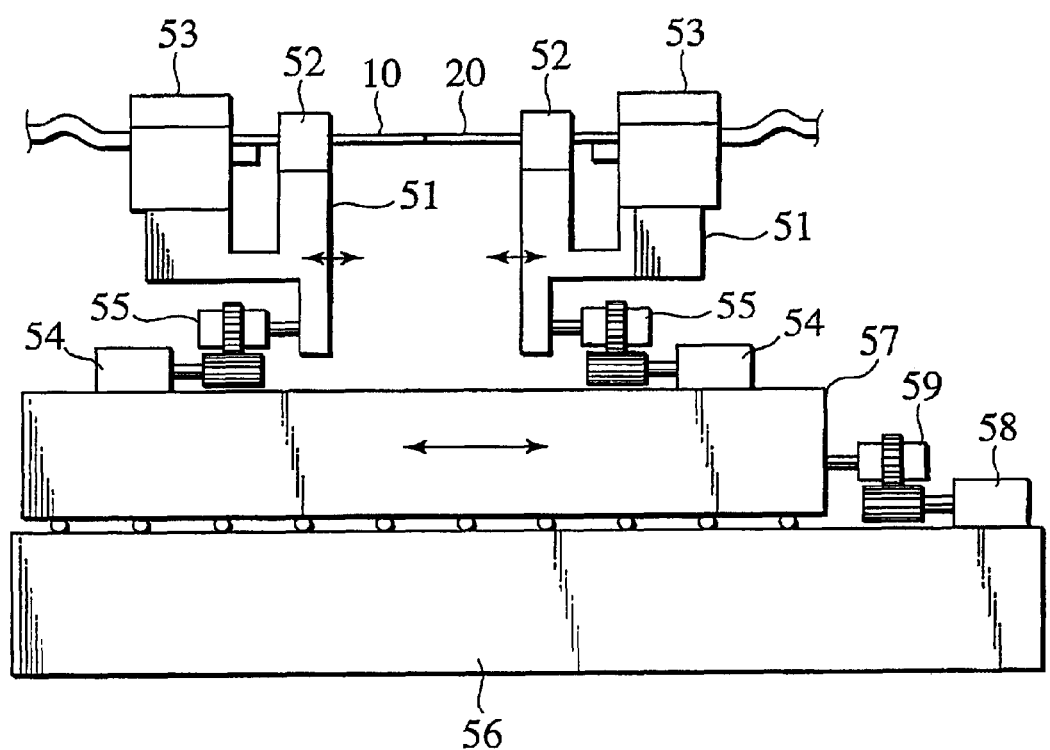
FIG. 2 is a side view of a detailed exemplary structure illustrating V-recessed blocks and associated support mechanisms.

Explaining the V-recessed blocks 52, 52 and their respective support mechanisms (transfer mechanisms) more in detail, as shown in FIG. 2, the movable blocks 51, 51 carry sheath clamps 53, 53 in addition to the V-recessed blocks 52, 52. The sheath clamps 53, 53 serve to clamp sheaths (protective films) (with the sheaths bearing reference numerals 13, 23 in FIGS. 3 and 4) of the optical fibers 10, 20 to fix them in given respective positions. The movable blocks 51, 51 are movable toward or away from one another in an axial direction (Z-axis direction) of the optical fibers 10, 20 with a motion transmission mechanism such as micrometers 55, 55 that convert rotational motions of motors 54, 54 to linear movements as shown by arrows. Also, while the movable blocks 51, 51 are structured to be also movable in the X- and Y-axis directions, a description of such mechanisms is herein omitted (and also omitted in the figure).

These movable blocks 51, 51 and the motors 54, 54 are mounted on the movable base 57 which is also movable on a fixed base 56 in the Z-direction, as shown by arrows, with motion transmission mechanisms such as a motor 58 and a micrometer 59. Further, the motors 54, 58 of FIG. 2 correspond to the drive unit 35 of FIG. 1.

Figure 3:
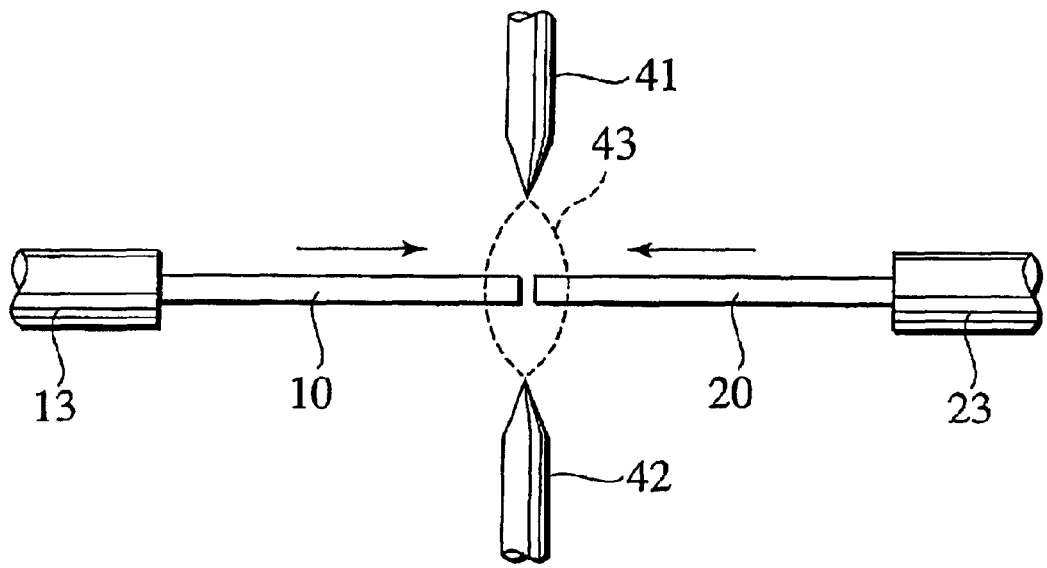
FIG. 3 is a side view illustrating how fusion splicing heating is conducted.

When fusion splicing the two optical fibers 10, 20, the sheaths 13, 23 closer to the splicing ends are peeled off as shown in FIG. 3 and ends of cores of the optical fibers 10, 20 are brought into abutment with one another. To this end, the optical fibers (cores) 10, 20 are set on the V-recessed blocks 52, 52. Then, after clamping partial areas of the sheaths 13, 23 with the sheath clamps 53, 53, the movable blocks 51, 51 are traveled in the X- and Y-directions for adjusting the respective positions using, for instance, the image obtained by the TV camera to allow the axes of the abutted optical fibers 10, 20 to be aligned with one another.

When the optical fibers 10, 20 are brought into abutment with one another under a centered condition in such a manner, the high voltage is applied to the electric discharge electrodes 41, 42, creating an electric arc discharge across these electrodes. When this takes place, an electric discharge beam 43 is produced between the electric discharge electrodes 41, 42, with heat being applied to the abutted ends of both the optical fibers 10, 20 such that the abutted ends begin to melt. When this occurs, these optical fibers 10, 20 are forcibly urged toward one another in an abutting direction as shown by arrows to cause the core ends to be fusion spliced.

Figure 4:
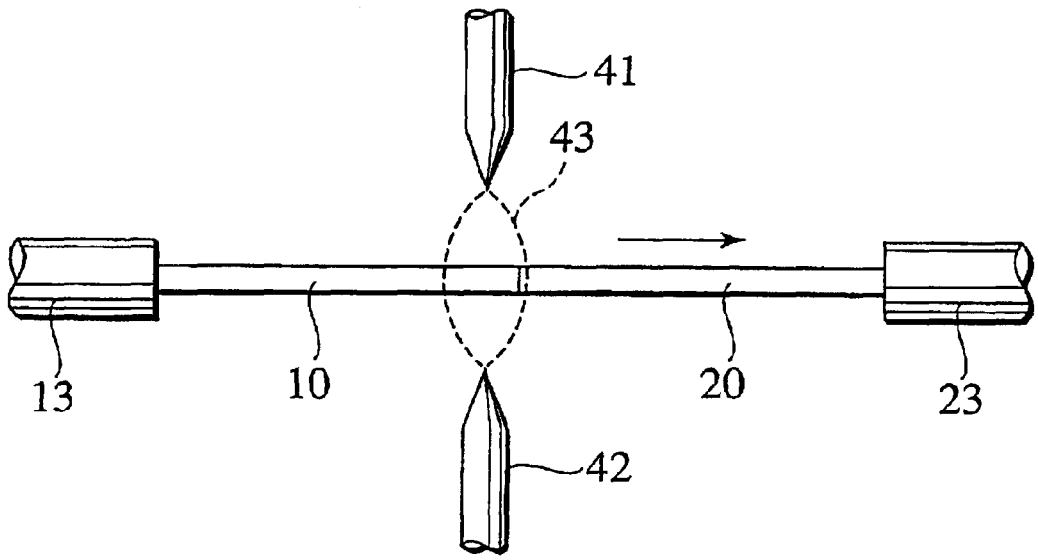
FIG. 4 is a side view illustrating how additional heating is conducted.

After the heating for fusion splicing has been terminated, additional heating is applied. Such additional heating is conducted only during a time interval in which the electric discharge beam 43 is traveled to shift its operative position as shown in FIG. 4. While the electric discharge beam 43 is traveled toward the relevant optical fiber, i.e., one of the optical fibers 10, 20, which is regarded to have a smaller mode field diameter, an analysis as to which optical fiber has the smaller mode field diameter is automatically conducted by image processing carried out in the image processing unit 33 prior to applying fusion discharge heating. Here, when it would assume the discrimination to be the optical fiber 10 which has the smaller mode field diameter, the optical fibers 10, 20 are traveled rightward in a united fashion while maintaining both the optical fibers 10, 20 to remain under a fusion spliced condition that has been just conducted through fusion splicing heating. With the detailed structure shown in FIG. 2, the movable base 57 is arranged to travel rightward.

Figure 5:
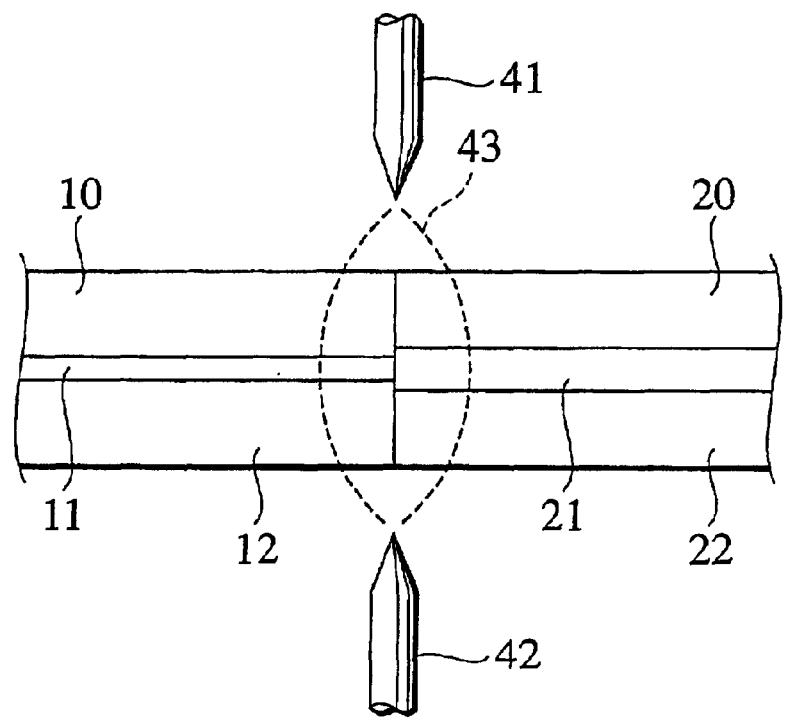
FIG. 5 is a side view illustrating core clad conditions of respective optical fibers during fusion splicing heating.
Figure 6:
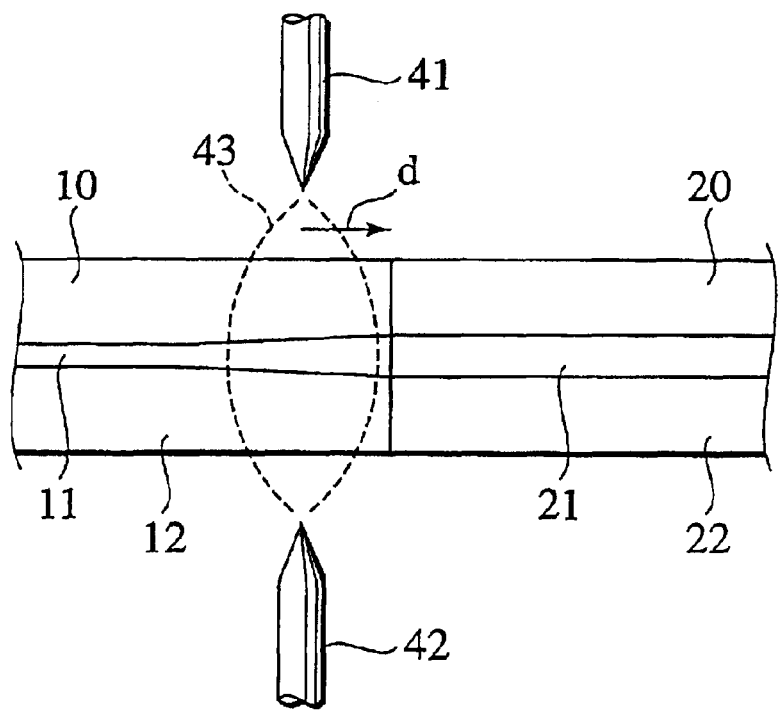
FIG. 6 is a side view illustrating core clad conditions of respective optical fibers during additional heating.

That is, during fusion splicing heating, the electric discharge beam 43 is aligned to be coincident with a center between the abutted portions of the optical fibers 10, 20 as shown in FIG. 5, causing the respective ends of the optical fibers 10, 20 to be evenly melted for uniform fusion splicing. Under such a condition in which the abutted ends are merely fusion spliced through fusion splicing heating, the two optical fibers 10, 20 are spliced to one another with a resultant difference in diameter between the core portions (mode field portions) 11, 21 of both the optical fibers 10, 20 as shown in FIG. 5. During additional heating, as shown in FIG. 6, electric discharge heating is conducted while permitting a heating center of the electric discharge beam 43 to travel toward the optical fiber 10 far remote from the abutted portions. In this exemplary embodiment, the electric arc discharging is caused to occur for additional heating purposes while compelling the fusion spliced optical fibers 10, 20 to travel rightward (in a direction as shown by an arrow) in the united fashion. As a result, dopant of the core portion 11 of the optical fiber 10 of the smaller mode field diameter begins to diffuse into a clad area 12 around the fiber ends to cause the diameter of the core portion 11 near the clad area 12 to become closer to that of the optical fiber 20 of the larger mode field diameter. Further, the mode field diameter of the core portion 11 is gradually enlarged to provide an elongated tapered length.

A travel distance d, in which the optical fibers 10, 20 are traveled, and a heating quantity to be applied during additional heating form important factors in order for dopant of the core portion 11 of the optical fiber 10 of the smaller mode field diameter to be diffused in an optimum fashion to allow the diameter of the core portion 11 to become closer to that of the core portion 21 of the optical fiber 20 of the larger mode field diameter while, at the same time, executing such a diffusion in a way to form the gently varying tapered profile to provide the elongated tapered length. These factors are automatically determined with the control unit 34 in response to information obtained from the image processing unit 33 prior to initiating fusion splicing electric discharge heating.

Figure 7:
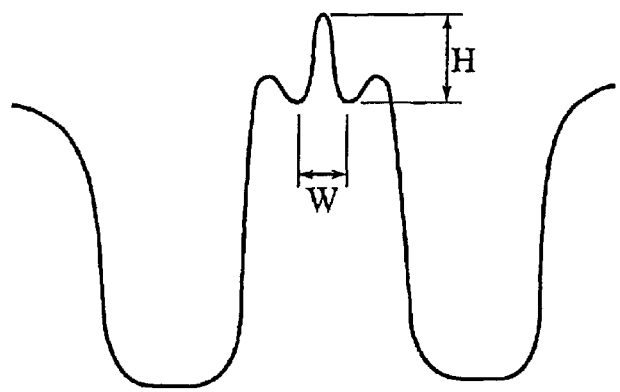
FIG. 7 is a view illustrating a curve representing a tendency of a brightness distribution of a light transmission image obtained through side areas of the optical fibers in terms of a direction traversing the optical fibers.
Figure 8A:
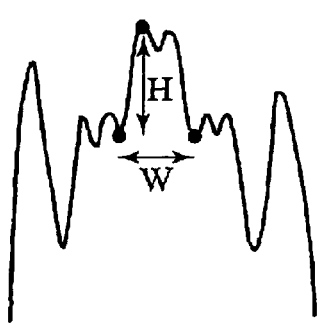
FIGS. 8A, 8B and 8C are views illustrating respective examples of further complicated actual brightness distribution curves of light transmission images obtained through side areas of the optical fibers in terms of a direction traversing the optical fibers.
Figure 8B:
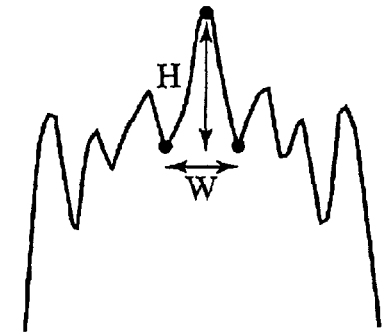
Figure 8C:
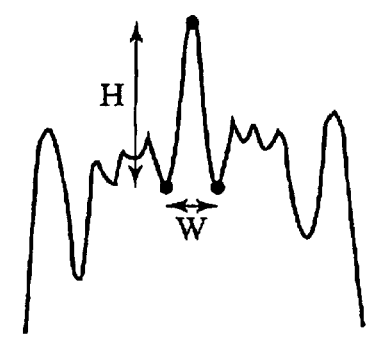

As set forth above, the TV camera 32 produces the transmitted light images passing through the side areas of both the optical fibers 10, 12 with their ends remaining in abutting engagement with one another prior to the fusion splicing electric discharge heating. Obtaining a brightness distribution patterns, in terms of directions traverse to the optical fibers provides a big trend as shown by a curve of FIG. 7. In a detailed practice, particularly, the brightness distribution patterns of the transmitted light images take the forms of further complicated patterns as shown in FIGS. 8A, 8B and 8C.

Figure 9:
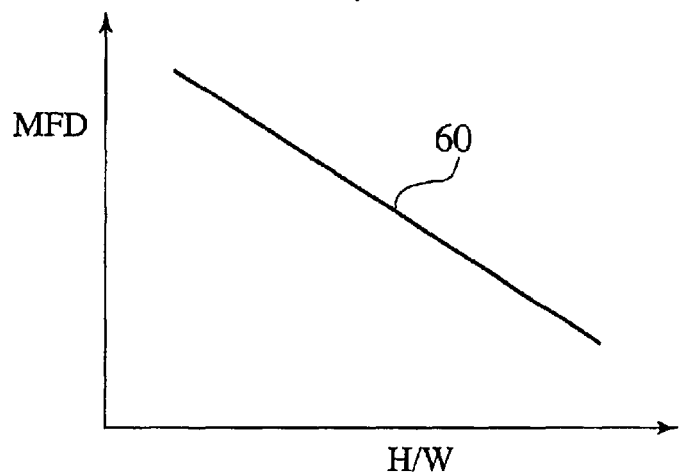
FIG. 9 is a graph illustrating a correlation between a ratio of (H/W) and a mode field diameter.

In these brightness distribution curves, assuming that a difference (height) between the central peak and neighboring troughs at both sides of the central peak in the brightness distribution pattern is represented as H and a distance between the neighboring troughs at both sides of the central peak is represented as W, there is a strong correlation between a value of (H/W) and the mode field diameter (MFD) as shown in FIG. 9. Namely, this correlation can be approximated by MFD=F (H/W) (which is represented at 60 in FIG. 9).

Since the image picked up with the TV camera 32 contains the transmitted light images of both the optical fibers 10, 20, obtaining the brightness distribution curves at lines passing across the optical fibers 10, 20, respectively, provides a capability of obtaining the mode field diameters MFDs of respective optical fibers 10, 20 using the formula of F (H/W). Also, since the function F can be determined by observing the wavelength of the light source 31 and the characteristics of lenses used in the TV camera 32, it may be preferably obtained in a preliminary stage. Such calculation is carried out with the use of the image processing unit 33. Further, the image processing unit 33 is structured so as to calculate the difference in mode field diameter between both the optical fibers 10, 20.

Figure 10:
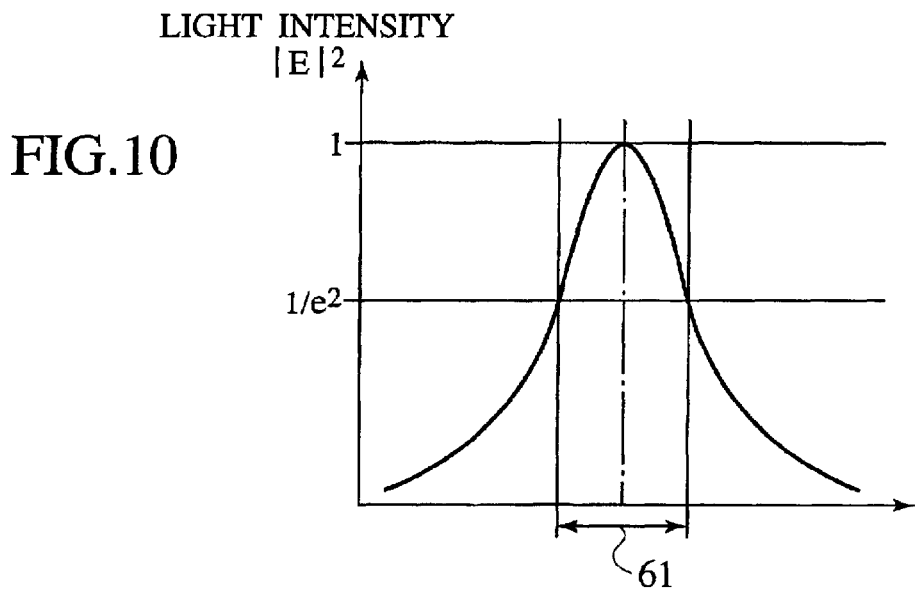
FIG. 10 is a graph for illustrating the mode field diameter.

Describing about the mode field diameter, also, the mode field diameter forms one of structural parameters of a single mode optical fiber. As shown in FIG. 10, assuming that the light intensity distribution pattern is defined as represented by a curve, the mode field diameter is represented as a diameter (as indicated at 61 in FIG. 10) which corresponds to $1/e^2$ (wherein e represents a bottom of a natural logarithm: 2.71828) in terms of the maximum value (normally corresponding to the center of the core portion).

Since respective mode field diameters of the optical fibers 10, 20 are obtained by the image processing unit 33 in such a manner set forth above, it is possible to automatically discriminate which mode field diameter is smaller than the other mode field diameter, with an accompanied capability for the control unit 34 to automatically determine a desired direction in which the electric discharge beam is to be traveled for the purpose of additional heating.

Figure 11:
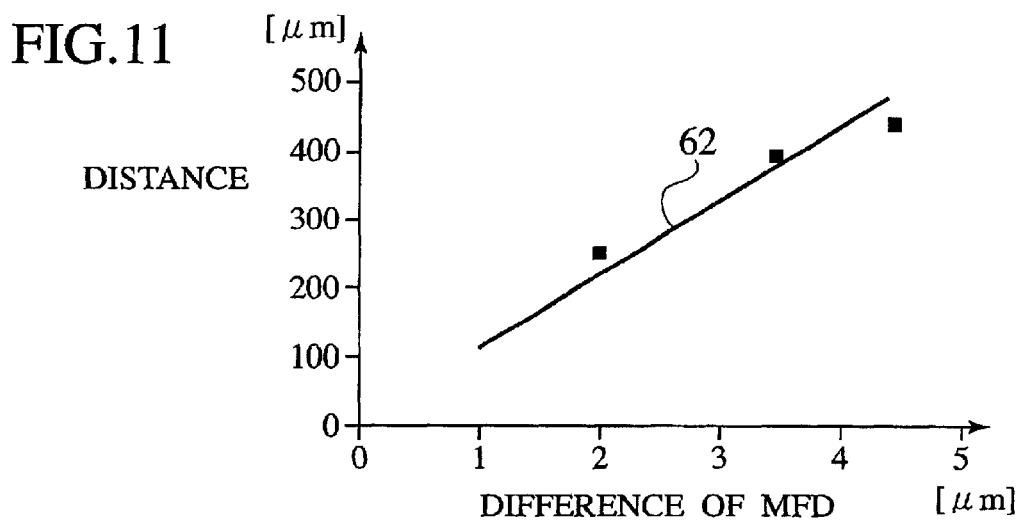
FIG. 11 is a graph illustrating the relationship between a mode field diametric difference and a travel distance during additional electric discharge heating.

Further, by determining the travel distance d and the heating quantity to be required during the additional heating process in dependence on the difference between the mode field diameters of both the optical fibers 10, 20, the fusion splicing of the opposed ends of the optical fibers 10, 20 are performed in an idealistically tapered dispersion pattern as previously set forth. Conducting experimental tests of fusion splicing operations using test pieces of different mode field diameters a number of times for the purpose of obtaining an optimum travel distance d enables several sets of data between the difference in MFD and the optimum travel distance d to be obtained. When plotting the difference in MFD on the abscissa axis and the travel distance on the axis of ordinates as shown in FIG. 11, it appears (as indicated at 62 in FIG. 11) that there is a linearly approximate relationship between these two parameters. Thus, an approximate function F between these two parameters can be obtained through experimental tests. The approximate function F is preliminarily stored in the control unit 34, which functions to obtain the travel distance by calculating the travel distance d using a formula of d=F (the difference in MFD) based on the difference in MFD transmitted from the image processing unit 33 for thereby controlling the drive unit 35. In such a case, also, the presence of the linearly approximate relationship between the travel distance and the difference in MFD allow the parameters of the function F to represent the coefficient and the amount of offset.

Figure 12:
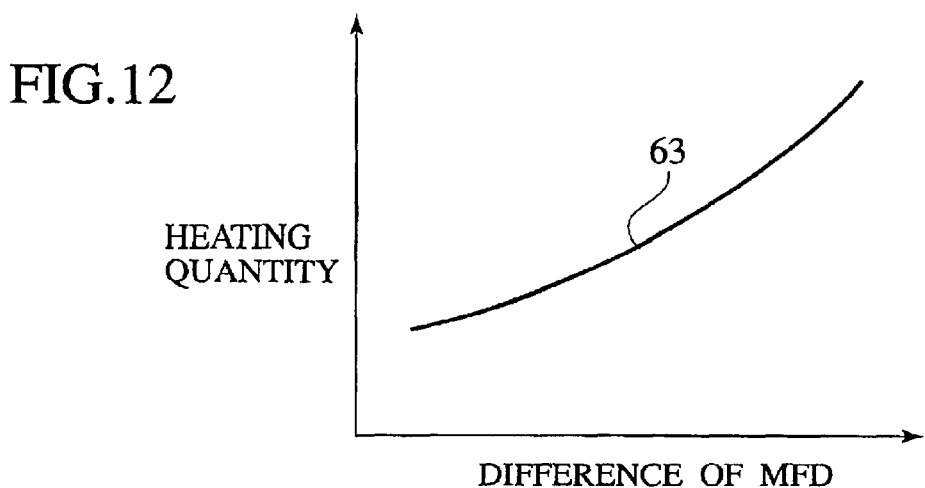
FIG. 12 is a graph illustrating the relationship between a mode field diametric difference and the heating quantity to be applied during additional electric discharge heating.

Conducting experimental tests for the fusion splicing operations using combinations of the optical fibers of the different mode field diameters a plurality of times for the purpose of obtaining an optimum heating quantity, furthermore, several sets of data between the difference in MFD and the optimum heating quantity can be obtained. When plotting the difference in MFD on the abscissa axis and the optimum heating quantity on the axis of ordinates as shown in FIG. 12, it appears that there is a correlation between these two parameters as represented by a curve 63 in FIG. 12. This approximate function f is preliminarily obtained through experimental tests, and is stored in the control unit 34. Then, the control unit 34 functions to obtain the heating quantity by calculating the heating quantity using a formula of the heating quantity=f (difference in MFD) on the basis of the difference in MFD transmitted from the image processing unit 33 for thereby controlling the electric discharge power supply 36. While the electric discharge heating quantity is determined with the electric discharge current and the time interval in which the electric discharge continues, the electric discharge current is mainly controlled because of many instances where difficulties are encountered in freely determining the time interval in which the electric discharge is conducted.

Further, since the mode field diameters of the respective optical fibers are preliminarily standardized for each optical fiber under the standard, the optical fiber fusion splicer may be structured such that the travel distance and the electric discharge heating quantity may be preliminarily stored in the control unit 34 by which the travel distance and the heating quantity are selected in dependence on information obtained from the image processing unit 33. By so doing, there is no need for calculating the travel distance and the electric discharge heating quantity using functions one by one, resulting in a practical advantage.

Moreover, it is preferable for the heating quantity required during additional electric discharge heating to be regulated such that the larger the distance between the position of the electric discharge beam 43 and the center of abutted ends of the two optical fibers, the lower will be the heating quantity so as to gradually decrease the degree of enlargement of the relevant mode field diameter to form the tapered shape. That is, control is performed such that the larger the distance between the position of the electric discharge beam 43 and the center of the abutted ends of the two optical fibers, the lower will be the electric discharge current, or the larger the distance between the position of the electric discharge beam 43 and the center of the abutted ends of the two optical fibers, the higher will the traveling speed of the electric discharge beam 43. Such a control may be carried out with the control unit 34. Structuring the control unit 34 to enable the above-described control to be carried out according to information related to the difference between the mode filed diameters of the optical fibers 10, 20 transmitted from the image processing unit 33, it is possible to control the extent of dispersion of dopant of the core portion 11 of the relevant optical fiber 10 of the smaller mode field diameter at an optimum rate to achieve an idealistically tapered mode dispersion pattern.

Further, while the preferred embodiment has been set forth above in conjunction with the exemplary structure which is arranged to allow the optical fibers 10, 20 to be traveled relative to the electric discharge electrodes 41, 42 and the electric discharge beam 43, on the contrary, it may be altered such that the electric discharge electrodes 41, 42 are traveled relative to the optical fibers 10, 20. Another alternative may be such that the electric discharge electrodes 41, 42 remain stationary and instead a deflection electrode is used to deflect the electric discharge beam 43 to cause only the electric discharge beam 43 to be traveled.

It may, of course, be altered such that the detailed structures of the V-recessed blocks 52, 52, which fix the optical fibers in place, and their retaining mechanisms (the moving mechanisms) take other varieties of arrangements than those set forth above. Of course, it is also contemplated that other modifications and changes may be made without departing from the spirit and scope of the invention.

As set forth above, according to the optical fiber fusion splicer and the optical fiber fusion splicing method of the present invention, there is no need for the two optical fibers of the different mode field diameters to be preliminarily examined to check which mode field diameter is small, between the two optical fibers, and instead the optical fibers are arbitrarily placed in positions to enable the abutted portions to be fusion spliced with a low connection loss. Further, since the respective mode field diameters of the two optical fibers to be fusion spliced and their diametric difference can be obtained with the image processing unit, it is possible for the travel distance and the heating quantity required during the additional heating mode to be automatically settled to respective optimum values according to the diametric difference for thereby carrying out the fusion splicing at the low connection loss. Further, an ability of an image processing unit of an observation type with a centering capability to be appropriated for the image processing unit for obtaining the transmitted light images of the optical fibers provides a capability of realizing a whole system in a simple structure at a low cost with a minimal number of components to be newly added.

What is claimed is:

1. An optical fiber fusion splicer comprising:
   an image pick up unit obtaining transmitted light images produced with lights passing through side areas of abutted portions between two optical fibers of mutually different mode field diameters;
   an image processing unit calculating mode field diameters of the respective optical fibers from brightness distributions of the images in terms of directions traverse to the optical fibers;
   an electric discharge heating unit applying electric discharge heating to the abutted portions with an electric arc discharge beam;
   a movable unit operative to move the electric arc discharge beam so as to travel relative to the abutted portions along an optical fiber axial direction; and
   a control unit controlling the electric discharge heating unit and the movable unit such that after conducting electric discharge fusion splicing heating to the abutted portions, a position of the electric arc discharge beam is traveled toward one of the optical fibers, of which mode field diameter is regarded to be small by the image processing unit, to apply additional electric discharge heating to the same to allow the mode field diameter of the relevant optical fiber to be enlarged.

2. The optical fiber fusion splicer according to claim 1, wherein:
   the image processing unit obtains a diametric difference between the respective mode field diameters of the optical fibers, and the control unit controls a travel distance, in which the movable unit is to be traveled during the additional electric discharge heating, in dependence on the diametric difference between the respective mode field diameters.

3. The optical fiber fusion splicer according to claim 1, wherein:
   the image processing unit obtains a diametric difference between the respective mode field diameters of the optical fibers, and the control unit controls a heating quantity, to be applied to the relevant optical fiber with the electric discharge heating unit during the additional electric discharge heating, in dependence on the diametric difference between the respective mode field diameters.

4. The optical fiber fusion splicer according to claim 1, wherein:
   the control unit is preliminarily stored with travel distances, in which the movable unit is to be traveled, and heating quantities, to be applied to the relevant optical fiber with the electric discharge heating unit, both of which are obtained in dependence on combinations between optical fibers of given mode field diameters and is operative to select one of the travel distances and one of the heating quantities in response to information obtained with the image processing unit.

5. The optical fiber fusion splicer according to claim 1, wherein:
   the electric discharge heating unit is operative to control a heating quantity to be applied during the additional electric discharge heating such that the larger a travel distance between the position of the electric arc discharge beam and a center of the abutted portions, the lower will be the heating quantity.

6. A method of fusion splicing optical fibers, comprising:
   processing transmitted light images obtained due to lights passing through side areas of abutted portions between two optical fibers of mutually different mode field diameters to calculate mode field diameters of the respective optical fibers from brightness distributions of the images in terms of directions traverse to the optical fibers while obtaining a diametric difference between the two optical fibers;
   fusion splicing the abutted ends of both the optical fibers by applying an electric discharge fusion heating to the abutted portions using an electric arc discharge beam; and
   enlarging the mode field diameter of one of the optical fibers, of which mode field diameter is regarded to be small by an image processing unit, while traveling the electric arc discharge beam toward the relevant optical fiber of the small mode field diameter along an axial direction thereof and applying an additional electric discharge heating thereto in such a manner that a travel distance of the electric discharge beam and an electric discharge heating quantity are determined in dependence on the diametric difference.

* * * * *